(12) United States Patent
Ou et al.

(10) Patent No.: US 11,865,759 B2
(45) Date of Patent: Jan. 9, 2024

(54) DEVICE AND METHOD FOR MANUFACTURING WOOD-PLASTIC COATED LUMBER COMPOSITE

(71) Applicant: SOUTH CHINA AGRICULTURAL UNIVERSITY, Guangdong (CN)

(72) Inventors: Rongxian Ou, Guangdong (CN); Qingwen Wang, Guangdong (CN); Xin Yi, Guangdong (CN); Wei Tang, Guangdong (CN); Lichao Sun, Guangdong (CN); Junjie Xu, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 453 days.

(21) Appl. No.: 17/047,344

(22) PCT Filed: Dec. 27, 2019

(86) PCT No.: PCT/CN2019/128960
§ 371 (c)(1),
(2) Date: Oct. 13, 2020

(87) PCT Pub. No.: WO2020/143476
PCT Pub. Date: Jul. 16, 2020

(65) Prior Publication Data
US 2021/0138710 A1    May 13, 2021

(30) Foreign Application Priority Data

Jan. 8, 2019   (CN) .................... 201910014126.7
Jan. 8, 2019   (CN) .................... 201910014163.8

(51) Int. Cl.
*B29C 48/154*   (2019.01)
*B29C 48/285*   (2019.01)
(Continued)

(52) U.S. Cl.
CPC .......... *B29C 48/154* (2019.02); *B29C 48/002* (2019.02); *B29C 48/06* (2019.02);
(Continued)

(58) Field of Classification Search
CPC ..... B29C 48/002; B29C 48/06; B29C 48/154; B29C 48/21; B29C 48/265;
(Continued)

(56) References Cited

U.S. PATENT DOCUMENTS 3,323,172 A * 6/1967 Pierson .................. B29C 48/10
                                                    118/500
2005/0106406 A1   5/2005 Curtis

FOREIGN PATENT DOCUMENTS

CN           2275024 Y      2/1998
CN           2330484 A      7/1999
(Continued)

OTHER PUBLICATIONS

English translation of CN 101871299, Oct. 10, 2010. (Year: 2010).*
(Continued)

*Primary Examiner* — Xiao S Zhao
*Assistant Examiner* — Joseph S Leyson
(74) *Attorney, Agent, or Firm* — Kaplan Breyer Schwarz, LLP; Stuart H. Mayer

(57) ABSTRACT

A wood-plastic/lumber composite co-extrusion feeder includes a frame, wherein at least one group of toothed conveying units, a tooth mark milling unit for milling tooth marks on an outer surface of a lumber, and a lumber co-extrusion mold are arranged on the frame in sequence, each toothed conveying unit includes a lower toothed pressure roller installed on a first fixed bearing seat and an upper toothed pressure roller installed on a first movable bearing seat, and after the first fixed bearing seat and the first movable bearing seat are connected by an adjustment unit, (Continued)

a first conveying channel having an adjustable height is formed between the upper toothed pressure roller and the lower-toothed pressure roller.

11 Claims, 3 Drawing Sheets

(51) Int. Cl.
  *B29C 48/06* (2019.01)
  *B29C 48/265* (2019.01)
  *B29C 48/00* (2019.01)
  *B29C 48/21* (2019.01)
  B29K 23/00 (2006.01)
  B29K 511/14 (2006.01)
  B29K 711/14 (2006.01)

(52) U.S. Cl.
  CPC .......... *B29C 48/21* (2019.02); *B29C 48/265* (2019.02); *B29C 48/2883* (2019.02); *B29C 48/2886* (2019.02); B29K 2023/065 (2013.01); B29K 2511/14 (2013.01); B29K 2711/14 (2013.01)

(58) Field of Classification Search
  CPC ............ B29C 48/2883; B29C 48/2886; B29C 48/336; B29C 48/34; B29K 2023/065; B29K 2511/14; B29K 2711/14; B27C 1/00; B27C 1/08; B27C 5/06
  See application file for complete search history.

(56) References Cited

FOREIGN PATENT DOCUMENTS

| CN | 1833836 A | 9/2006 |
|---|---|---|
| CN | 200957620 Y | 10/2007 |
| CN | 101871299 A | 10/2010 |
| CN | 102189575 A | 9/2011 |
| CN | 102431245 A | 5/2012 |
| CN | 202607781 U | 12/2012 |
| CN | 202726478 U | 2/2013 |
| CN | 103732042 A | 6/2014 |
| CN | 104210080 A | 12/2014 |
| CN | 104228236 A | 12/2014 |
| CN | 106065194 A | 11/2016 |
| CN | 106113738 A | 11/2016 |
| CN | 107866878 A | 4/2018 |
| CN | 108162094 A | 6/2018 |
| CN | 109822858 A | 5/2019 |
| CN | 109849447 A | 6/2019 |
| DE | 102004010873 A1 | 9/2005 |
| JP | 56-95656 A | 8/1981 |
| JP | 2004-174721 A | 6/2004 |
| JP | 2010-110941 A | 5/2010 |

OTHER PUBLICATIONS

Second Office Action in related application CN201910014126.7 and English translation thereof, dated Dec. 15, 2020.
Notice of Refusal in related application JP 2020-552788 and English translation thereof, dated Oct. 14, 2021.
European Search Opinion and Supplemental European Search Report in related application EP 19 909.157.0 dated May 27, 2021.

* cited by examiner

DEVICE AND METHOD FOR MANUFACTURING WOOD-PLASTIC COATED LUMBER COMPOSITE

CROSS-REFERENCE TO RELATED APPLICATIONS

This application is a national stage filing under 35 U.S.C. § 371 of international application number PCT/CN2019/128960, filed Dec. 27, 2019, which claims priority to Chinese patent application No. 2019100141267 filed Jan. 8, 2019 and Chinese patent application No. 2019100141638 filed Jan. 8, 2019. The contents of these applications are incorporated herein by reference in their entirety.

FIELD

The present disclosure relates to a composite co-extrusion molding device and a method for manufacturing a composite, and more particularly, to a wood-plastic/lumber composite co-extrusion feeder and a method for manufacturing a wood-plastic coated lumber composite.

BACKGROUND

On a premise that forestry resources are reducing and high-quality wood is insufficient to meet a use demand, the rapid development of fast-growing plantation wood may relieve a pressure of wood shortage to a certain extent. However, the fast-growing wood is soft and easy to crack and deform, and has poor water resistance and corrosion resistance, therefore it has a low direct utilization value as a low-quality wood.

Wood-plastic composite has been widely used in recent years due to excellent dimensional stability, water resistance and damp resistance, corrosion resistance and moth resistance, energy saving and environmental protection, and other characteristics. The inherent creep property of thermoplastic polymer composite and the brittle failure defect of wood-plastic with a high wood fiber content enable the application of this type of materials to be limited to indoor and outdoor decorations and landscape materials with corrosion resistance and water resistance, thus being not suitable for a load-bearing structure material with high requirements on stiffness and toughness. The defects of a low mechanical strength and coexistence of creep and brittle failure seriously restrict the large-scale popularization and application of the wood-plastic in high value-added fields such as high-grade doors and windows, vehicles and green buildings.

The wood-plastic co-extrusion molding technology is a layered extrusion technology arisen in recent years, which is able to perform optimized design on a structure of the composite in a targeted manner. At present, wood-plastic-wood-plastic and wood-plastic-plastic co-extrusion composite in the world are able to improve weather resistance and dimensional stability of the wood-plastic composite, but there are still defects of the low mechanical strength and the coexistence of creep and brittle failure. Wood-plastic-metal co-extrusion material has a high mechanical strength, but there are still defects of high material density, easy corrosion of a metal lining and difficulty in recycling. Compared with the wood-plastic composite, lumber material has a high comprehensive mechanical property, but the material is warped and deformed after absorbing moisture, is easy to decay, and is difficult to be used efficiently and directly. How to optimize these two types of resources is a problem to be solved urgently.

Aiming at different characteristics of the wood-plastic and the fast-growing lumber, in order to make best use of the advantages and bypass the disadvantages, and complement each other's advantages, the wood-plastic composite with high hardness, no cracking, water resistance and corrosion resistance, and environmental friendliness is used as a surface layer, and the fast-growing plantation wood and a recombinant material thereof with low density, tensile strength, and outstanding impact resistance and creep resistance are used as core materials. The composite with creep resistance, no brittle failure, high strength-to-weight ratio, high cost performance and excellent durability is able to be prepared by the co-extrusion molding technology. JP2010110941A discloses a method for preparing a profile with a plastic-coated wood core material. According to the method, plastic penetrates into a groove processed in a surface of wood by a negative pressure to combine the wood with the plastic, thus forming a plastic shell layer to protect the wood located on a core layer. CN104228236A further discloses a method for preparing an improved wood-plastic composite by combining a wood core having a tongue-and-groove and a dovetail joint with the wood-plastic composite. According to the above method, the wood-plastic composite is coated on the lumber core, so as to be able to obtain the wood-plastic/lumber composite with a certain interface bonding strength. However, the above two methods both need to process the groove in the surface of the wood in advance, so that a process becomes complicated during continuous production, and a manufacturing defect is easily generated when multiple wood cores are continuously fed, thus increasing a difficulty in manufacturing, and causing a large area of peeling off from one end to the other end once a local damage occurs due to poor interface bonding for the significant surface polarity difference between the wood and the wood-plastic material.

In the existing wood-plastic co-extrusion unit, no lumber processing device is installed in front of a co-extrusion mold. Therefore, the lumber is pre-processed, and due to secondary clamping of the lumber, consistency of the lumber penetrating into a center of the wood-plastic co-extrusion mold cannot be guaranteed, thus leading to different product specifications after wood-plastic co-extrusion, which cannot guarantee the product quality.

SUMMARY

The present disclosure is intended to provide a wood-plastic/lumber composite co-extrusion feeder. By arranging a toothed conveying unit and a tooth mark milling unit in front of a lumber co-extrusion mold, during conveying, irregular wood materials can be processed into a precise-sized lumber and tooth marks can be pressed thereon to facilitate subsequent injection molding. Meanwhile, the present disclosure further provides a method for manufacturing a wood-plastic coated lumber composite.

The solutions adopted by the present disclosure to solve the technical problems thereof are as follows.

In a first aspect of the present disclosure there is provided:
a wood-plastic/lumber composite co-extrusion feeder, which includes a frame, wherein at least one group of toothed conveying units, a tooth mark milling unit for milling tooth marks on an outer surface of a lumber, and a lumber co-extrusion mold are arranged on the frame in sequence, each toothed conveying unit includes a lower toothed pressure roller installed on a first fixed bearing seat and an upper toothed pressure roller installed on a first movable bearing seat, and after the first fixed bearing seat and the first movable bearing seat are connected by an adjustment unit, a first conveying channel having an adjustable height is formed between the upper toothed pressure roller and the lower-toothed pressure roller.

In some embodiments of the wood-plastic/lumber composite co-extrusion feeder, at a front side of the toothed conveying unit, a rubber pressure roller unit is arranged which includes a lower rubber roller installed on a second fixed bearing seat and an upper rubber roller installed on a second movable bearing seat, after the second fixed bearing seat and the second movable bearing seat are connected by an adjustment unit, a second conveying channel having an adjustable height is formed between the upper rubber roller and the lower rubber roller, and an elastic rubber layer is sheathed on outer surfaces of the upper rubber roller and the lower rubber roller.

In some embodiments of the wood-plastic/lumber composite co-extrusion feeder, the adjustment unit includes a sliding rod, a fixed-length sleeve sheathed outside the sliding rod, an adjusting nut for adjustment and a compressed spring with one end pressed against the adjusting nut.

In some embodiments of the wood-plastic/lumber composite co-extrusion feeder, each toothed conveying unit is provided with a group of limiting rubber roller sets, each limiting rubber roller set includes a left limiting rubber roller and a right limiting rubber roller, and a limiting space is formed between the left limiting rubber roller and the right limiting rubber roller.

In some embodiments of the wood-plastic/lumber composite co-extrusion feeder, two toothed conveying units are provided, and the two toothed conveying units are located between two groups of limiting rubber roller sets.

In some embodiments of the wood-plastic/lumber composite co-extrusion feeder, the tooth mark milling unit includes a first tooth mark milling mechanism for milling upper and lower surfaces of a lumber and a second tooth mark milling mechanism for milling left and right surfaces of the lumber, the first tooth mark milling mechanism includes a first milling cutter frame and a first tooth mark roller located at a rear side of the first milling cutter frame, the second tooth mark milling mechanism includes a second milling cutter frame and a second tooth mark roller located at a rear side of the second milling cutter frame, and the first milling cutter frame and the second milling cutter frame are respectively provided with a milling cutter.

In a second aspect of the present disclosure there is provided:

a method for manufacturing a wood-plastic coated lumber composite, which includes the following steps:

1) feeding a lumber core by the wood-plastic/lumber composite co-extrusion feeder according to the first aspect of the present disclosure, and processing the lumber core to form point-like gear pressing marks on the lumber core;

2) weaving or winding a continuous high-strength fiber on a surface of the lumber core to form a fiber mesh; and 3) co-extruding outside the fiber mesh to form a wood-plastic layer to obtain a wood-plastic coated lumber composite.

In some embodiments of the manufacturing method, the wood-plastic coated lumber composite includes the lumber core coated with a wood-plastic composite layer, and the surface of the lumber core is provided with the point-like gear pressing marks; the continuous fiber mesh is further coated outside the lumber core with the point-like gear pressing marks, and the fiber mesh is coated and restrained by the wood-plastic composite layer; and the high-strength fiber is at least one of a carbon fiber, a glass fiber, a basalt fiber, an aramid fiber, a polyester fiber, a polyamide fiber and a polyacrylonitrile fiber.

In some embodiments of the manufacturing method, the high-strength fiber is a fiber pre-soaked with a prepreg resin matrix, and the prepreg resin matrix is at least one of a wood-plastic composite or polypropylene, polyethylene, polyvinyl chloride, polylactic acid and polystyrene.

In some embodiments of the manufacturing method, the wood-plastic composite layer includes a first wood-plastic layer and a second wood-plastic layer which are connected, wherein the first wood-plastic layer is completely coated on the lumber core and the point-like gear pressing marks and forms a nail structure in the point-like gear pressing marks, the continuous fiber mesh is arranged between the first wood-plastic layer and the second wood-plastic layer, and the second wood-plastic layer is completely coated on the fiber mesh.

In some embodiments of the manufacturing method, a pressing mark depth is 0.5 mm to 4 mm independently; and a pressing mark density is 1 piece/$cm^2$ to 20 pieces/$cm^2$ independently, and is preferably 4 pieces/$cm^2$ to 10 pieces/$cm^2$.

In some embodiments of the manufacturing method, thicknesses of the first wood-plastic layer and the second wood-plastic layer are 0.1 mm to 2 mm and 1 mm to 5 mm respectively.

The present disclosure has the beneficial effects as follows.

In some embodiments of the present disclosure, by arranging the toothed conveying unit and the tooth mark milling unit in front of the lumber co-extrusion mold, during conveying, irregular wood materials can be processed into a precise-sized lumber and tooth marks can be pressed thereon, and a novel profile of wood-plastic composite in which lumber is coated with wood-plastic composite can be co-extruded, which is simple and practical, and easy to use and maintain. Interface bonding strength between wood-plastic composite and lumber can be increased due to an anchor chain effect formed by the tooth marks pressed on the lumber with wood-plastic composite melt.

In some embodiments of the manufacturing method of the present disclosure, according to the manufactured wood-plastic coated lumber composite, wood-plastic and lumber have a strong bonding force, thus being more stable in structure, and a local damage would not cause a large area of peeling off. Meanwhile, the wood-plastic composite on a surface can be prevented from warping and deformation when being heated, and the wood-plastic composite can be further prevented from peeling off after being heated, such as preventing natural peeling off or artificial peeling off after intense sun light exposure in summer.

BRIEF DESCRIPTION OF THE DRAWINGS

In order to explain the technical solutions in the embodiments of the present disclosure more clearly, the accompanying drawings needed to be used in description of the embodiments are briefly described hereinafter. Obviously, the described accompanying drawings are only some but not all of the embodiments of the present disclosure, and those skilled in the art may also obtain other design schemes and accompanying drawings according to these accompanying drawings without going through any creative work.

DETAILED DESCRIPTION OF THE EMBODIMENTS

The concept, the specific structure and the generated technical effect of the present disclosure are clearly and completely described hereinafter with reference to the embodiments and the accompanying drawings to fully understand the objectives, the features and the effects of the present disclosure. Obviously, the described embodiments are only some but not all of the embodiments of the present disclosure, and based on the embodiments of the present disclosure, other embodiments obtained by those skilled in the art without going through any creative work all belong to the scope of protection of the present disclosure. In addition, all coupling/connection relationships mentioned therein do not indicate direct connection between members only, but indicate that a better coupling structure may be formed by adding or reducing a coupling accessory according to specific implementation conditions.

Figure 1:
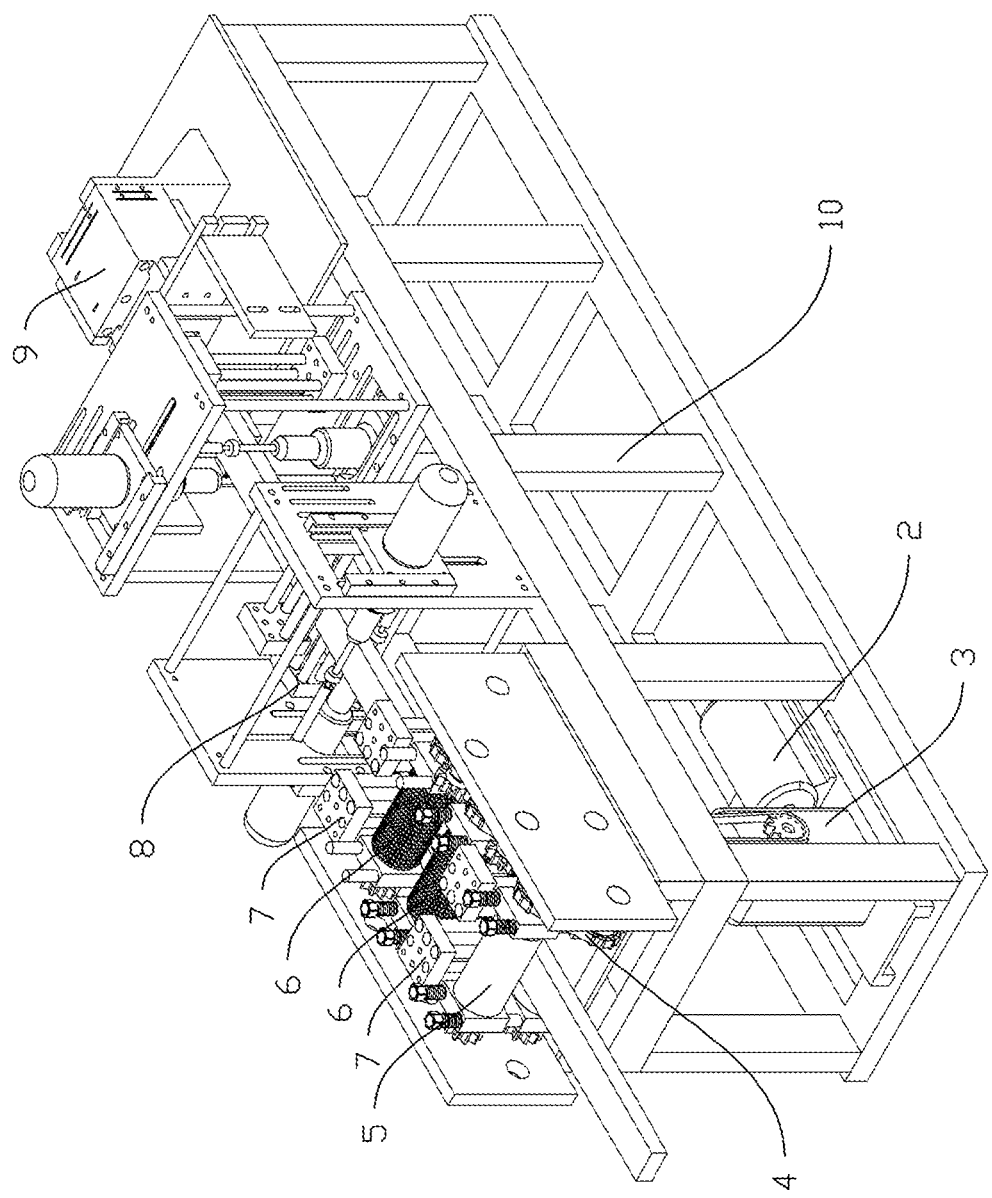
FIG. 1 is a structure diagram of some embodiments of a wood-plastic/lumber composite co-extrusion feeder according to the present disclosure.
Figure 2:
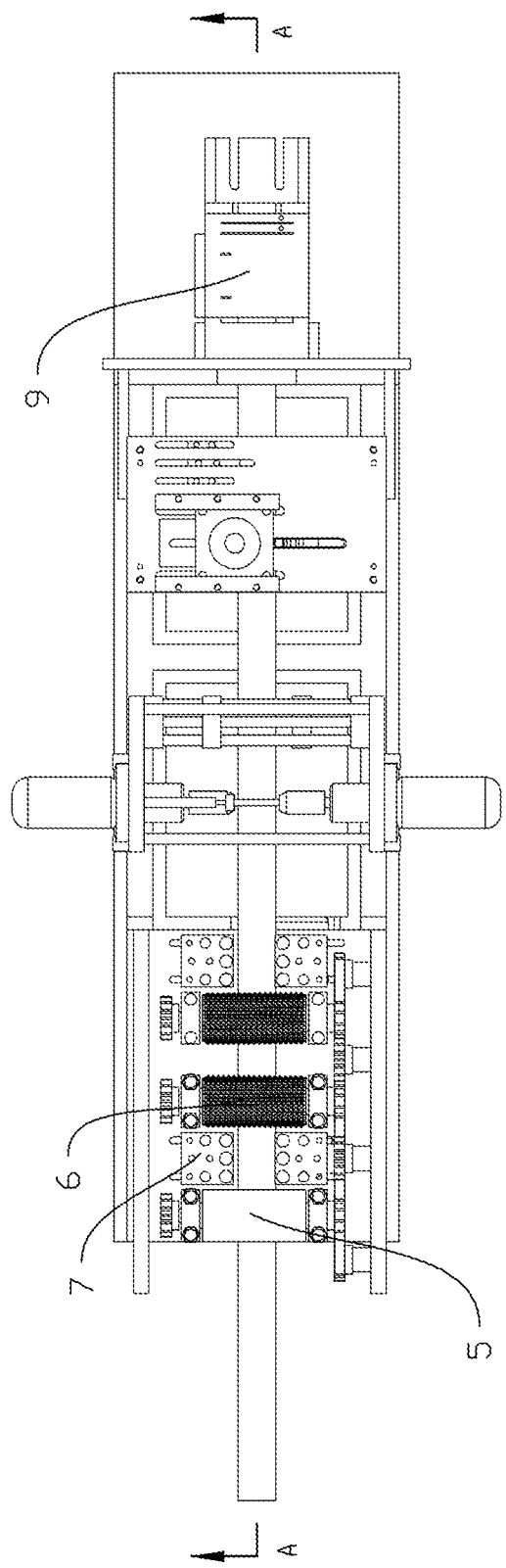
FIG. 2 is a top view of some embodiments of the wood-plastic/lumber composite co-extrusion feeder according to the present disclosure.
Figure 3:
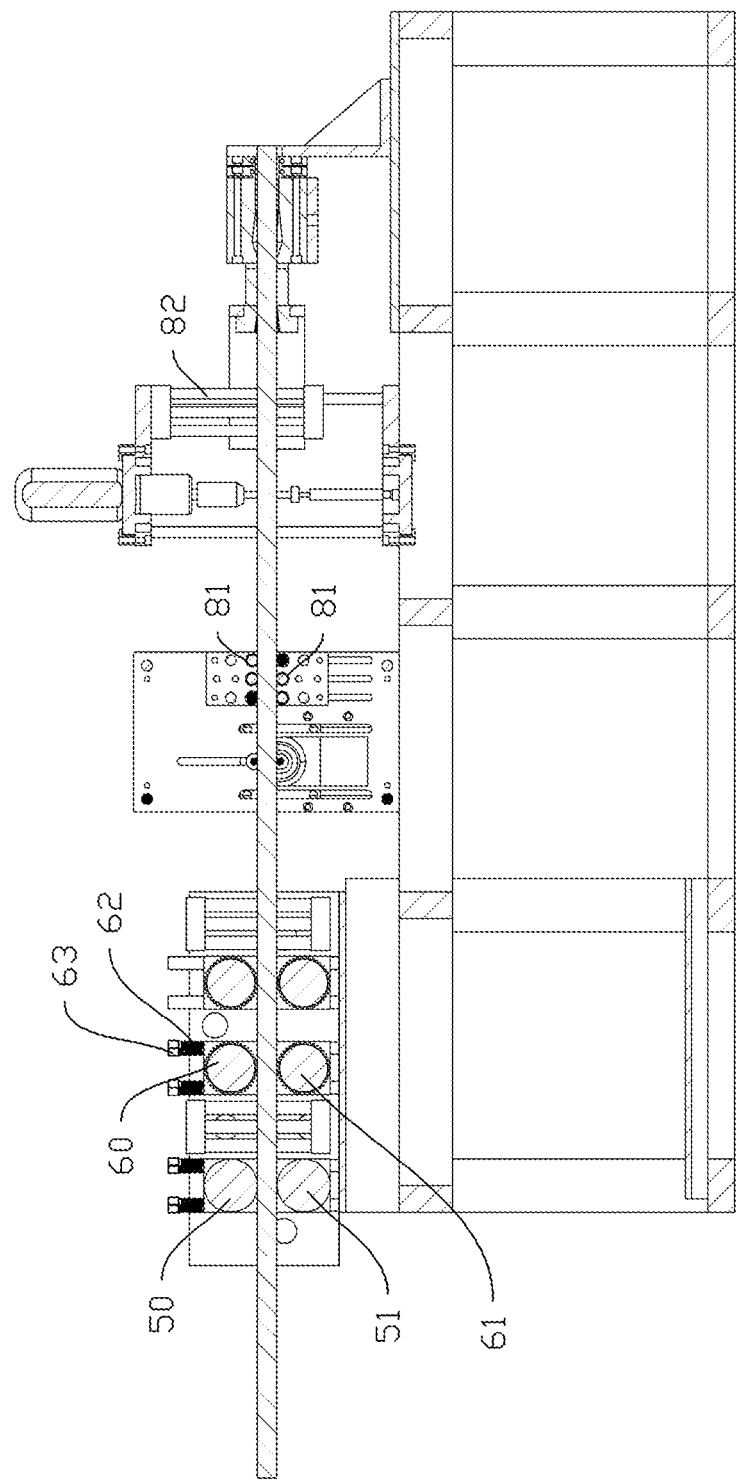
FIG. 3 is a cross-section view in a direction A-A of FIG. 2.

With reference to FIG. 1 to FIG. 3, a wood-plastic/lumber composite co-extrusion feeder includes a frame 10. At least one group of toothed conveying units 6, a tooth mark milling unit 8 for milling tooth marks on an outer surface of a lumber, and a lumber co-extrusion mold 9 are arranged on the frame 10 in sequence. Each toothed conveying unit 6 includes a lower toothed pressure roller 61 installed on a first fixed bearing seat and an upper toothed pressure roller 60 installed on a first movable bearing seat, and after the first fixed bearing seat and the first movable bearing seat are connected by an adjustment unit, a first conveying channel having an adjustable height is formed between the upper toothed pressure roller 60 and the lower-toothed pressure roller 61. The frame 10 is further provided with a speed regulating motor 2, at an output end of the speed regulating motor 2, a speed reducer 3 is installed and connected with the toothed conveying unit 6 and a rubber pressure roller unit 5 by a chain drive 4.

The speed regulating motor 2 and the speed reducer 3 control a speed at which the lumber enters the mold by the chain drive, and the rubber pressure roller unit 5 controls an irregular error when the lumber enters initially. The toothed conveying unit 6 accurately controls a forward speed of the lumber and offsets a reverse resistance generated during operation of the milling cutter set in the tooth mark milling unit 8, and the two groups of limiting rubber roller sets define and maintain a forward linear position of the lumber. The lumber is milled into a precise-sized lumber by the milling cutter on a fine tooth mark milling machine and the tooth marks are pressed thereon, and then the lumber enters the wood-plastic/lumber composite co-extrusion mold 9.

Hard alloy sharp teeth are densely distributed on the upper toothed pressure roller 60 and the lower toothed pressure roller 61, and bite into the surface of the lumber, so as to accurately control the forward speed of the lumber and offset the reverse resistance generated during operation of the milling cutter set in the tooth mark milling unit 8. By replacing the middle fixed-length sleeve, it is suitable for the lumbers with different size requirements. A compressed spring and an adjusting nut are used for maintaining a pressure of the upper toothed pressure roller 60.

At a front side of the toothed conveying unit 6, a rubber pressure roller unit 5 is arranged which includes a lower rubber roller 51 installed on a second fixed bearing seat and an upper rubber roller 50 installed on a second movable bearing seat. After the second fixed bearing seat and the second movable bearing seat are connected by an adjustment unit, a second conveying channel having an adjustable height is formed between the upper rubber roller 50 and the lower rubber roller 51, and an elastic rubber layer is sheathed on outer surfaces of the upper rubber roller 50 and the lower rubber roller 51. The upper rubber roller 50 and the lower rubber roller 51 have a large friction force and a corresponding elasticity, thus being able to adapt to the irregular error when the lumber enters initially. By replacing the middle fixed-length sleeve, it is suitable for the lumbers with different size requirements. The compressed spring and the adjusting nut are used for maintaining the pressure of the upper rubber roller 50.

The adjustment unit includes a sliding rod, a fixed-length sleeve sheathed outside the sliding rod, an adjusting nut 63 for adjustment and a compressed spring 62 with one end pressed against the adjusting nut 63. One end of the adjusting nut 63 is respectively inserted into a corresponding movable bearing seat, one end of the compressed spring 62 is pressed against the corresponding movable bearing seat, and the other end of the compressed spring 62 is pressed against the adjusting nut 63.

Each toothed conveying unit 6 is provided with a group of limiting rubber roller sets 7, each limiting rubber roller set 7 includes two holding brackets, a left limiting rubber roller and a right limiting rubber roller, and a plurality of bearing seats are arranged on each holding bracket. The left limiting rubber roller and the right limiting rubber roller are installed between two bearing seats of the corresponding holding brackets. A limiting space is formed between the left limiting rubber roller and the right limiting rubber roller.

Two toothed conveying units 6 are provided, and the two toothed conveying units 6 are located between two groups of limiting rubber roller sets 7, which means that the two groups of limiting rubber roller sets 7 are installed at two sides of two groups of toothed conveying units 6 to limit and maintain the forward linear position of the lumber. The left limiting rubber roller and the right limiting rubber roller have a corresponding elasticity, thus being able to adapt to the irregular error when the lumber enters initially.

The tooth mark milling unit 8 includes a first tooth mark milling mechanism for milling upper and lower surfaces of a lumber and a second tooth mark milling mechanism for milling left and right surfaces of the lumber. The first tooth mark milling mechanism includes a first milling cutter frame and a first tooth mark roller 81 located at a rear side of the first milling cutter frame, the second tooth mark milling mechanism includes a second milling cutter frame and a second tooth mark roller 82 located at a rear side of the second milling cutter frame, and the first milling cutter frame and the second milling cutter frame are respectively provided with a milling cutter. The first tooth mark milling mechanism and the second tooth mark milling mechanism are respectively provided with a high-speed milling cutter motor.

In the embodiment, the first tooth mark milling mechanism is located at a front side of the second tooth mark milling mechanism. After the lumber passes through the first tooth mark milling mechanism and the second tooth mark milling mechanism in sequence, and the corresponding milling cutters respectively process the upper and lower surfaces and the left and right surfaces of the lumber, the lumber is milled into the precise-sized lumber, and the tooth marks are pressed on the corresponding surfaces of the lumber by the first tooth mark roller 81 and the second tooth mark roller 82. The lumber enters the wood-plastic/lumber composite co-extrusion mold 9, and the tooth marks on the precise-sized lumber form an anchor chain effect with wood-plastic composite melt in the co-extrusion mold, thus increasing an interface bonding strength.

A method for manufacturing a wood-plastic coated lumber composite, which includes the following steps:

1) feeding a lumber core by the wood-plastic/lumber composite co-extrusion feeder as described according to the first aspect of the present disclosure and processing the lumber core to form point-like gear pressing marks on the lumber core;

2) weaving or winding a continuous high-strength fiber on a surface of the lumber core to form a fiber mesh; and 3) co-extruding outside the fiber mesh to form a wood-plastic layer to obtain a wood-plastic coated lumber composite.

In some embodiments of the manufacturing method, the wood-plastic coated lumber composite includes the lumber core, the lumber core is coated with a wood-plastic composite layer, and the surface of the lumber core is provided with the point-like gear pressing marks. The continuous fiber mesh is also coated outside the lumber core with the point-like gear pressing marks, and the fiber mesh is coated and restrained by the wood-plastic composite layer.

The high-strength fiber is at least one of a carbon fiber, a glass fiber, a basalt fiber, an aramid fiber, a polyester fiber, a polyamide fiber and a polyacrylonitrile fiber.

In some embodiments of the manufacturing method, the high-strength fiber is a fiber pre-soaked with a prepreg resin matrix, and the prepreg resin matrix is at least one of a wood-plastic composite or polypropylene, polyethylene, polyvinyl chloride, polylactic acid and polystyrene.

In some embodiments of the manufacturing method, the wood-plastic composite layer includes a first wood-plastic layer and a second wood-plastic layer which are connected, wherein the first wood-plastic layer is completely coated on the lumber core and the point-like gear pressing marks and forms a nail structure in the point-like gear pressing marks, the continuous fiber mesh is arranged between the first wood-plastic layer and the second wood-plastic layer, and the second wood-plastic layer is completely coated on the fiber mesh.

In some embodiments of the manufacturing method, a pressing mark depth is 0.5 mm to 4 mm independently; and a pressing mark density is 1 piece/cm$^2$ to 20 pieces/cm$^2$ independently, and is preferably 4 pieces/cm$^2$ to 10 pieces/cm$^2$.

In some embodiments of the manufacturing method, thicknesses of the first wood-plastic layer and the second wood-plastic layer are 0.1 mm to 2 mm and 1 mm to 5 mm respectively.

A raw material for the wood-plastic composite includes all wood fiber materials and mixtures thereof, and a thermoplastic polymer, such as PP\PE\PVC\PS\polylactic acid and a blend of the mixtures thereof. For convenience of comparison, in the following embodiments and comparative embodiments, the wood-plastic composite consists of 40% (mass fraction) wood powder, 50t % (mass fraction) high-density polyethylene, 5% talcum powder, 3% coupling agent and 2% lubricant.

Embodiment 1

A wood-plastic coated lumber composite includes a lumber core. A cross section of the lumber core is 74 mm×34 mm. A surface of the lumber core is provided with point-like gear pressing marks with a depth of 2 mm and a density of 10 pieces/cm$^2$. A continuous fiber mesh is further coated outside the lumber core, and the fiber mesh is coated and restrained by the wood-plastic composite layer.

The fiber mesh is formed by weaving or winding a continuous carbon fiber outside the lumber core.

The wood-plastic composite layer is coated on the lumber core and the fiber mesh in a co-extruded manner, wherein the wood-plastic composite layer includes a first wood-plastic layer and a second wood-plastic layer. The first wood-plastic layer has a thickness of 1 mm, and the second wood-plastic layer has a thickness of 2 mm. The first wood-plastic layer is completely coated on the lumber core and the point-like gear pressing marks and forms a nail structure in the point-like gear pressing marks. The continuous fiber mesh is arranged between the first wood-plastic layer and the second wood-plastic layer, and the second wood-plastic layer is completely coated on the fiber mesh.

Embodiment 2

The Embodiment 2 is the same as the Embodiment 1, except that the carbon fiber is pre-soaked with the wood-plastic composite.

Embodiment 3

The Embodiment 3 is the same as the Embodiment 1, except that the pressing mark depth is 4 mm.

Embodiment 4

The Embodiment 4 is the same as the Embodiment 1, except that the pressing mark depth is 0.5 mm.

Embodiment 5

The Embodiment 5 is the same as the Embodiment 3, except that the carbon fiber is pre-soaked with the wood-plastic composite.

Embodiment 6

The Embodiment 6 is the same as the Embodiment 2, except that the pressing mark density is 5 pieces/cm$^2$.

Embodiment 7

The Embodiment 7 is the same as the Embodiment 2, except that the pressing mark density is 1 piece/cm$^2$.

Embodiment 8

The Embodiment 8 is the same as the Embodiment 2, except that the pressing mark density is 25 pieces/cm$^2$.

Comparative Embodiment 1

The Comparative Embodiment 1 is the same as the Embodiment 1, except that the pressing mark depth is 0.3 mm.

Comparative Embodiment 2

The Comparative Embodiment 2 is the same as the Embodiment 1, except that the continuous fiber mesh is not coated outside the lumber core.

Comparative Embodiment 3

The Comparative Embodiment 3 is the same as the Embodiment 1, except that the surface of the lumber core has no pressing mark.

Comparative Embodiment 4

The Comparative Embodiment 4 is the same as the Embodiment 1, except that the surface of the lumber core has no pressing mark, and the continuous fiber mesh is not coated outside the lumber core.

|  | Interface bonding strength (MPa) |
| --- | --- |
| Embodiment 1 | 1.07 to 1.26 |
| Embodiment 2 | 1.28 to 1.59 |
| Embodiment 3 | 1.21 to 1.49 |
| Embodiment 4 | 0.51 to 0.75 |
| Embodiment 5 | 1.55 to 1.91 |
| Embodiment 6 | 1.11 to 1.34 |
| Embodiment 7 | 0.92 to 1.10 |
| Embodiment 8 | 1.33 to 1.67 |
| Comparative Embodiment 1 | 0.42 to 0.64 |
| Comparative Embodiment 2 | 0.40 to 0.61 |
| Comparative Embodiment 3 | 0.33 to 0.54 |
| Comparative Embodiment 4 | 0.22 to 0.37 |

The pressing marks on the surface of the lumber core and the coated continuous fiber mesh are able to greatly improve the interface bonding strength, and the pressing mark depth has a positive correlation with the interface bonding strength within a certain range. When the pressing mark depth is higher than a certain range, the interface bonding strength is not improved significantly. The carbon fiber pre-soaked with the wood-plastic composite can better improve the interface bonding strength. Increasing the pressing mark density in a certain range is beneficial for improving the interface bonding strength.

The foregoing describes the preferred embodiments of the present disclosure in detail, but the present disclosure is not limited to the embodiments. Those skilled in the art may further make various equivalent modifications or substitutions without violating the principle of the present disclosure, and these equivalent modifications or substitutions are all included in the scope defined by the claims of the present application.

The invention claimed is:

1. A method for manufacturing a wood-plastic coated lumber composite, comprising the following steps:
   1. feeding a lumber core by a wood-plastic/lumber composite co-extrusion feeder, and processing the lumber core to form point-like gear pressing marks on the lumber core, wherein the wood-plastic/lumber composite co-extrusion feeder comprises a frame, at least one group of toothed conveying units, a tooth mark milling unit for milling tooth marks defining the point-like gear pressing marks on an outer surface of the lumber core, and a lumber co-extrusion mold, wherein the at least one group of toothed conveying units, the tooth mark milling unit, and the lumber co-extrusion mold are arranged on the frame in sequence, each toothed conveying unit comprises a lower toothed pressure roller installed on a first fixed bearing seat and an upper toothed pressure roller installed on a first movable bearing seat, and after the first fixed bearing seat and the first movable bearing seat are connected by a first adjustment unit, a first conveying channel having an adjustable height adjusted by the first adjustment unit is formed between the upper toothed pressure roller and the lower-toothed pressure roller;
   2. weaving or winding a continuous fiber on the surface of the lumber core to form a fiber mesh; and
   3. co-extruding outside the fiber mesh to form a wood-plastic layer to obtain a wood-plastic coated lumber composite.

2. The method according to claim 1, wherein the wood-plastic coated lumber composite comprises the lumber core coated with a wood-plastic composite layer, and the surface of the lumber core is provided with the point-like gear pressing marks; the fiber mesh is further coated with the wood-plastic composite layer outside the lumber core with the point-like gear pressing marks, and the fiber mesh is coated and restrained by the wood-plastic composite layer; and the fiber is at least one of a carbon fiber, a glass fiber, a basalt fiber, an aramid fiber, a polyester fiber, a polyamide fiber and a polyacrylonitrile fiber.

3. The method according to claim 2, wherein the fiber is a fiber pre-soaked with a prepreg resin matrix, and the prepreg resin matrix is at least one of a wood-plastic composite, polypropylene, polyethylene, polyvinyl chloride, polylactic acid and polystyrene; the wood-plastic composite layer and the wood-plastic layer outside the fiber mesh respectively comprise a first wood-plastic layer and a second wood-plastic layer which are connected, wherein the first wood-plastic layer is completely coated on the lumber core and the point-like gear pressing marks and forms a nail structure in the point-like gear pressing marks, the fiber mesh is arranged between the first wood-plastic layer and the second wood-plastic layer, and the second wood-plastic layer is completely coated on the fiber mesh.

4. The method according to claim 3, wherein thicknesses of the first wood-plastic layer and the second wood-plastic layer are 0.1 mm to 2 mm and 1 mm to 5 mm respectively.

5. The method according to claim 2, wherein at a front side of the at least one group of toothed conveying unit a rubber pressure roller units is arranged which comprises a lower rubber roller installed on a second fixed bearing seat and an upper rubber roller installed on a second movable bearing seat, after the second fixed bearing seat and the second movable bearing seat are connected by a second adjustment unit, a second conveying channel having an adjustable height adjusted by the second adjustment unit is formed between the upper rubber roller and the lower rubber roller, and an elastic rubber layer is sheathed on outer surfaces of the upper rubber roller and the lower rubber roller.

6. The method according to claim 5, wherein the second adjustment unit comprises: a second sliding rod, a second fixed-length sleeve sheathed outside the second sliding rod, a second adjusting nut for adjustment and a second compressed spring with one end pressed against the second adjusting nut.

7. The method according to claim 2, wherein the first adjustment unit comprises: a first sliding rod, a first fixed-length sleeve sheathed outside the first sliding rod, a first adjusting nut for adjustment and a first compressed spring with one end pressed against the first adjusting nut.

8. The method according to claim 2, wherein each toothed conveying unit is provided with a group of limiting rubber roller sets, each limiting rubber roller set comprises a left limiting rubber roller and a right limiting rubber roller, and a limiting space is formed between the left limiting rubber roller and the right limiting rubber roller.

9. The method according to claim 8, wherein two toothed conveying units are provided, and the two toothed conveying units are located between two groups of limiting rubber roller sets.

10. The method according to claim 2, wherein the tooth mark milling unit comprises a first tooth mark milling mechanism for milling upper and lower surfaces of the lumber core and a second tooth mark milling mechanism for milling left and right surfaces of the lumber core, the first tooth mark milling mechanism comprises a first milling cutter frame and a first tooth mark roller located at a rear side of the first milling cutter frame, the second tooth mark milling mechanism comprises a second milling cutter frame and a second tooth mark roller located at a rear side of the second milling cutter frame, and the first milling cutter frame and the second milling cutter frame are respectively provided with a milling cutter.

11. The method according to claim 1, wherein a pressing mark depth is 0.5 mm to 4 mm independently; and a pressing mark density is 1 piece/cm$^2$ to 20 pieces/cm$^3$ independently.

\* \* \* \* \*